United States Patent
Hannah

(12)
(10) Patent No.: US 6,452,975 B1
(45) Date of Patent: Sep. 17, 2002

(54) METHOD AND APPARATUS TO TRANSMIT SIGNALS OVER A CABLE

(75) Inventor: Eric C. Hannah, Pebble Beach, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/283,665

(22) Filed: Apr. 1, 1999

(51) Int. Cl.[7] .................................................. H04B 3/06
(52) U.S. Cl. ...................... 375/257; 375/285; 375/296; 375/350; 333/18; 333/28 R
(58) Field of Search .................................. 375/257, 285, 375/296, 350; 333/18, 28 R, 206

(56) References Cited

U.S. PATENT DOCUMENTS

| | | | | | |
|---|---|---|---|---|---|
| 5,455,843 | A | * | 10/1995 | Cherubini et al. | .......... 375/230 |
| 6,104,750 | A | * | 8/2000 | Yiu | .............................. 375/229 |
| 6,212,229 | B1 | * | 4/2001 | Salinger | ...................... 375/224 |

* cited by examiner

Primary Examiner—Amanda T. Le
(74) Attorney, Agent, or Firm—Blakley, Sokoloff, Taylor & Zamfan LLP

(57) ABSTRACT

A method of transmitting signals on a cable comprises filtering the signals at a transmitter to compensate for nonuniform frequency response of the cable at a maximum cable length, and clipping the signals at a receiver when the filtering results in overshoot of a signal level by the signals.

15 Claims, 4 Drawing Sheets

METHOD AND APPARATUS TO TRANSMIT SIGNALS OVER A CABLE

BACKGROUND

1. Field

The invention relates to the field of transmission of signals and more particularly to the transmission of signals over cables.

2. Background Information

Digital devices may be coupled over a cable in order to exchange signals. The cable may be a single copper wire conductor or a pair of copper wire conductors twisted together in what is known as a "twisted pair" configuration (among numerous possibilities). The Institute of Electrical and Electronics Engineers (IEEE) and other standards bodies have defined cable configurations for which signaling characteristics are well defined. One such standard involves twisted pair cable employed to carry Ethernet data traffic and is called International Standards Organization (ISO) standard IEC SPEC No. 11801:1995 (or CAT-5 for short). CAT-5 provides for signal transmission at up to 125 million baud (125 Mbaud) over copper twisted pair cable at lengths up to 100 meters.

Cables may have signaling characteristics which distort signals transmitted over the cable as transmission length increases. For example, at cable lengths approaching 100 meters, binary signals on a CAT-5 cable may degenerate from an approximately rectangular shape into a shape with less well defined edges. Furthermore, phase shifts in the digital signal may occur as transmission distance increases.

These changes in signal properties may be especially prominent as the frequency content of the signal increases. A binary digital signal may be divided into its frequency components using a Fourier Transform. As transmission length increases a more noticeable attenuation of amplitude and shift of phase may be observed for the higher frequency components (for example, frequency components over 1 megahertz) of the signal than for the lower frequency components.

To compensate for the non-uniform frequency response of cables, equalizers may be employed on receiver devices along the cable. The equalizers may comprise passive filter components (such as resistors and capacitors) to allow higher frequency components of the signal to pass while attenuating lower frequency components of the signal to adjust for the attenuation and phase shift to the high frequency components caused by the cable. However, the attenuation to apply may vary according to the distance along the cable of the receiver from the transmitter. Receivers closer to the transmitter may employ little or no attenuation while receivers further distant may employ substantial attenuation to equalize the effects on higher frequencies imposed by the cable.

It is typically not known at manufacturing time at what distance from a transmitting device a receiving device may be located along the cable. It may therefore be necessary for the receiving device to employ an adaptive equalizer which may detect the amount of attenuation imposed by the cable on higher signal frequencies and adapt the filter characteristics to compensate accordingly. Adaptive equalizers may be more complex and expensive than other equalization solutions, and may require more passive components.

SUMMARY

Signals transmitted on a cable are filtered at a transmitter to equalize for non-uniform frequency response of the cable at a maximum cable length. The signals are clipped at a receiver when the filtering results in overshoot of a signal level by the signals.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

DETAILED DESCRIPTION

The embodiments described herein are merely illustrative, and one skilled in the art will appreciate that numerous modifications can be made which nonetheless fall within the scope of the present invention.

One embodiment of a data transmitter in accordance with the present invention may be implemented by providing, at the transmitter, a filter to compensate for non-uniform frequency response of the cable at a maximum cable length. The maximum cable length is the longest distance which a signal from the transmitting device may be expected to travel to a receiving device. For example, for devices to be deployed on CAT-5 cable the filter may be designed to compensate for non-uniform frequency response at 100 meters of cable length. Receiving devices located at less than the maximum cable length from the transmitting device may clip the digital signal when the filtering results in overshoot of a binary signal level (a digital one or zero) by the signals. The term "clip" is applied in a broad sense to any technique which may be applied to eliminate the resulting overshoot in the signals. Thus, while classic clipping circuits, well known in the art, may be employed, any technique which eliminates the overshoot in the signals may be employed instead.

In one embodiment for devices to deploy on CAT-5 cable, a Butterworth filter may be employed at the transmitting device. The Butterworth filter may comprise a transfer function of $$C+s^2/(s^2+\sqrt{2}s+1)$$

where C is approximately 0.4. In one embodiment the signals are binary (that is, comprising two predetermined signal levels, "one" and "zero" or alternatively, "high" and "low". Such a Butterworth filter, when applied to binary signals on CAT-5 cable, may equalize the binary signals at a receiver located approximately 100 meters from the transmitter. The equalized signals may be sufficiently distinguishable for the receiver to recover the original bits. Furthermore, such a filter may not introduce excessive jitter, that is, drift from the cable's implicit signaling clock.

Although any filter technology may be employed, including analog filter technology using passive components (resistors and capacitors, for example), in one embodiment a digital to analog converter (DAC) is applied as the filter. The DAC filter is explained more completely in FIG. 4.

Figure 1:
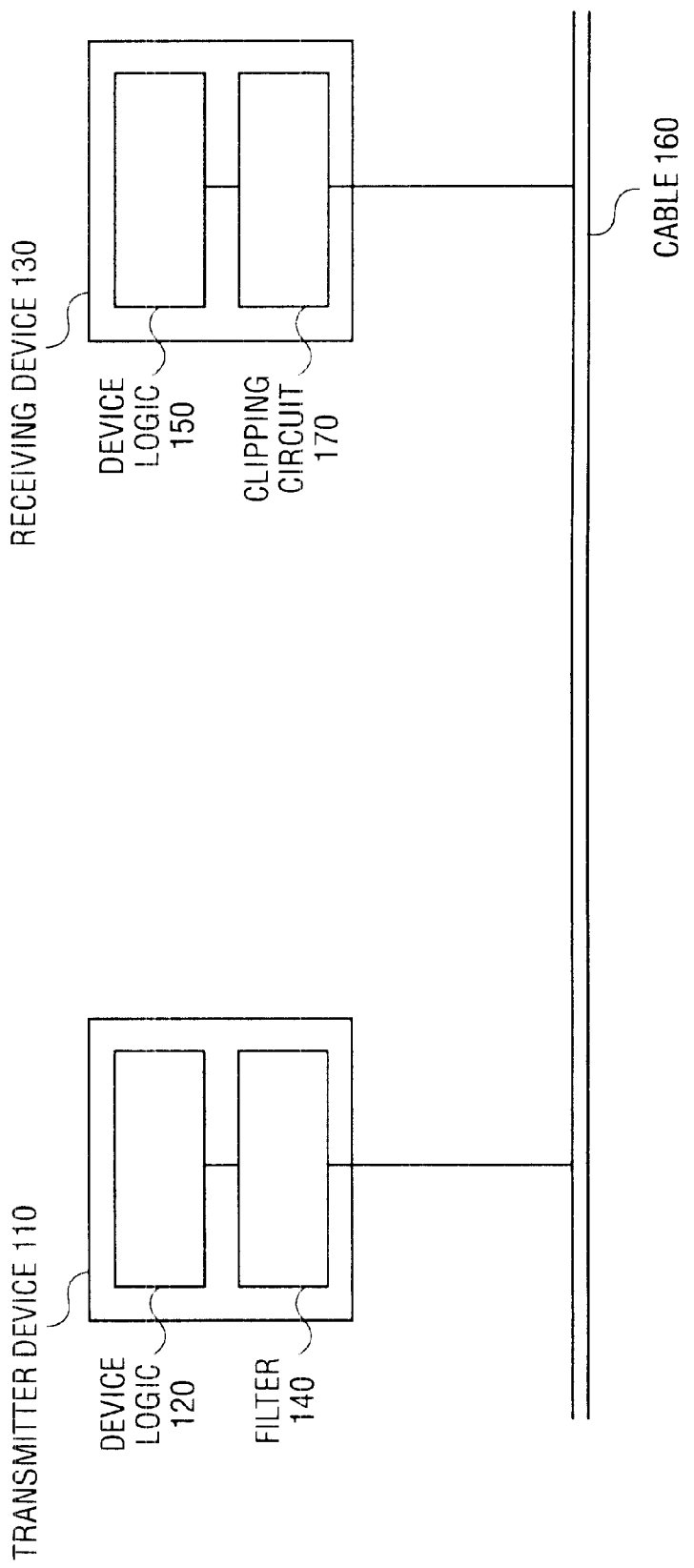
FIG. 1 shows an embodiment of a device to transmit signals over a cable to a receiving device.

FIG. 1 shows an embodiment 100 of a device to transmit signals over a cable 160 to a receiving device 130. The transmitting device 110 and the receiving device 130 are shown coupled to different points along the cable 160. In practice receiving device 130 may be located at various distances from transmitting device 110. The transmitting device 110 comprises device logic 120 to generate the digital signal to transmit and a filter 140 coupled to the device logic 120 to apply a filtering function to the digital signal.

The filtering function is designed to equalize low frequency components of the digital signal with high frequency components of the signal at a maximum cable length. The maximum cable length may be determined as the maximum transmitting distance that will separate the transmitting device from a receiving device on the cable (for example, 100 meters on a CAT-5 cable). Equalization may be accomplished by attenuating low frequency components of the signal to an extent approximately equal to the attenuation introduced by the cable on high-frequency components. A high pass filter function may typically be employed for this purpose.

When the filter 140 is designed to equalize the transmitted digital signal for the maximum cable length, the equalization may result in overshoot by the signal of predetermined signal levels at receiving devices located at cable lengths less than the maximum length. In embodiments employing binary signaling, such predetermined signal levels may comprise a digital one or a digital zero. In some embodiments, filtering at the transmitter 110 may result in an oscillating overshoot and undershoot situation (ringing) of the transmitted signal.

The receiving device 130 comprises a clipping circuit 170 to clip the overshoot of the digital signal resulting from the filtering function at cable lengths shorter than the maximum cable length. Again, any of numerous techniques well known in the art may be employed to remove the overshoot from the signal (i.e. "clip" the signal). Receiving device 130 further comprises device logic 150 to receive the clipped signal from the clipping circuit 170.

In one embodiment signaling on the cable 160 may conform to the IEEE P1394B standard. IEEE P1394B defines signaling characteristics for cables up to 100 meters in length at up to 125 million baud (125 Mbaud). This signaling rate may typically comprise 100 Mbaud of signals to be transmitted, including header information in the signaling protocol, and approximately 25 Mbaud of added bits to maintain the physical signaling characteristics of the cable at suitable levels. Transmission of long sequences of digital ones or digital zeros may enhance undesirable cable signaling characteristics, well-known in the art, such as charging and base line wander. Reducing long sequences of a single signal level may reduce the occurrence of low frequency (i.e. approximately DC) frequency components on the cable. Signal transitions may be forced to occur after a predetermined sequence at a single signal level. For example, a signal transition from one binary signal level to another may be inserted every ten bits or so. When signaling protocols function to reduce long sequences at a single signal level, the cable 160 may be referred to as a non-return to zero (NRZ) cable.

It may be possible to simplify the design of the transmitting device 110, and more particularly the filter 140, when NRZ is implemented at signaling protocol levels above the physical layer.

When higher levels of the signaling protocol provide signal transitions to eliminate long runs at a single digital signal level (i.e. NRZ is implemented above the physical layer), the transmitter 110, and more particularly filter 140, may not need be designed to provide such transitions. For example, the 8B/10B signaling protocols may guarantee the insertion of a transition bit after a sequence of signals at a single digital signal level. The 8B/10B protocols may be implemented at a protocol level above the physical protocol layer and therefore may enable the employment of transmitters 110 which do not provide for the insertion of transition bits. In addition to reducing base-line wander and cable charging, reducing long sequences of signals at a single signal level may reduce the presence of low frequency components on the cable 160.

Again, employing NRZ signaling, and permitting overshoot on the digital signal levels at receiver devices may simplify the design of the transmitter filter 140 while eliminating the need to employ adaptive equalizers at the receiver 130. Instead of adaptive equalizers, receiver 130 may employ simple clipping techniques well known in the art.

Figure 2:
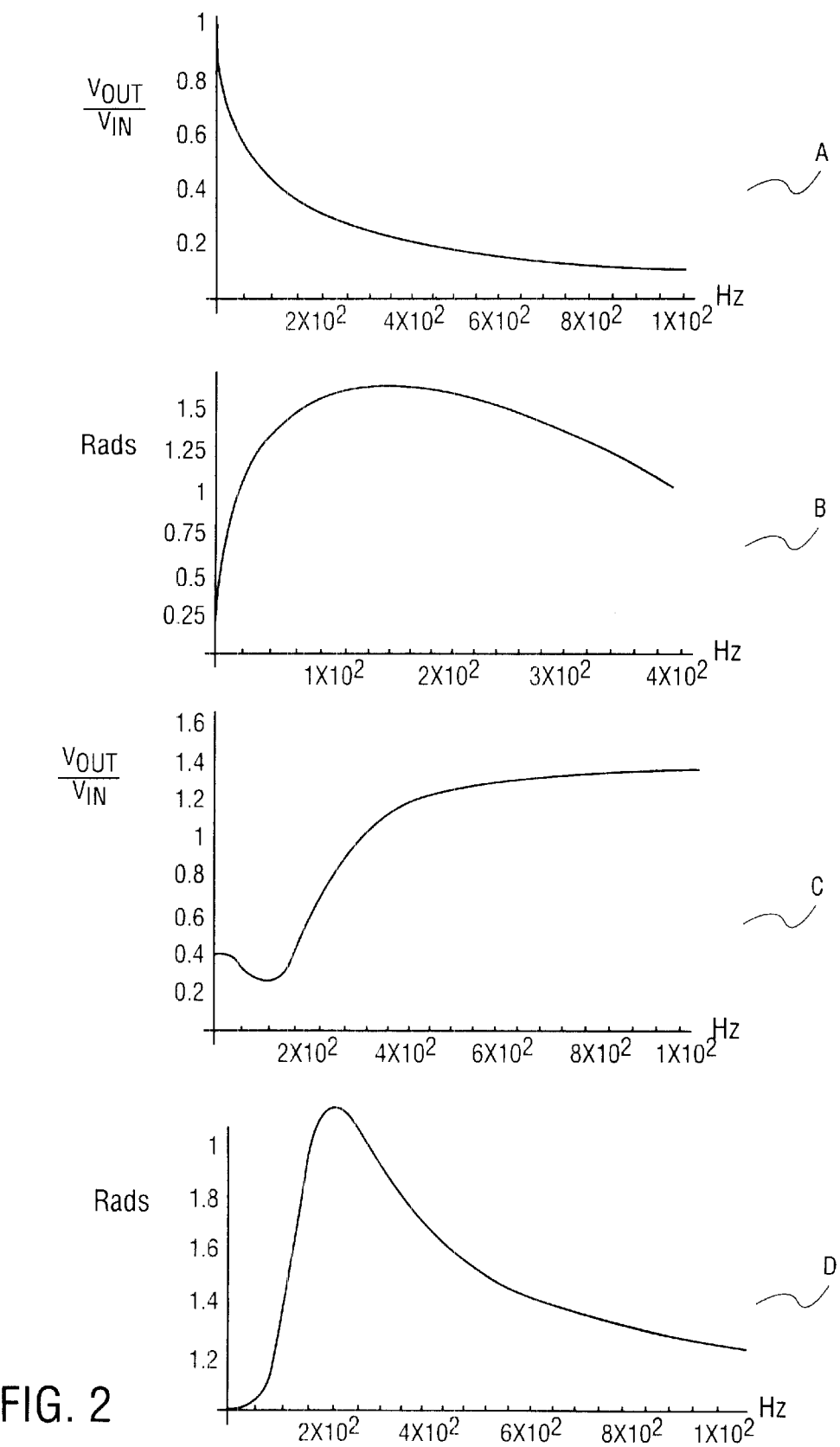
FIG. 2 shows graphs of possible cable signal characteristics, and corresponding transmitter filter characteristics which may equalize for the cable characteristics.

FIG. 2 shows graphs of possible cable signal characteristics, and corresponding transmitter filter characteristics which may equalize for the cable characteristics. Graph A shows a typical frequency amplitude response characteristic for a CAT-5 cable at 100 meters of length. The characteristic may be described as essentially a low pass filter characteristic. Graph B shows a typical 100 meter phase shift characteristic for a similar cable, adjusted to remove the natural phase shift produced by the ideal signal propagation speed (electrical signals propagate down an ideal cable at approximately the speed of light, producing a measurable phase shift). Graph C shows the amplitude characteristic for one embodiment of a Butterworth highpass filter which may be employed to compensate for the nonuniform cable frequency response depicted by Graphs A and B. Note the DC offset characteristic of approximately 0.4 which allows for the transfer of very low frequency signal components. Graph D shows a phase shift characteristic for the filter embodiment with amplitude characteristic depicted in Graph C. The embodiment Butterworth filter may be described by an equation such as:

$$0.4+s^2/(s^2+\sqrt{2}s+1)$$

Of course, this is only one embodiment. For example, filters comprising constant terms and alternate transfer functions may be employed as the application dictates.

Figure 3:
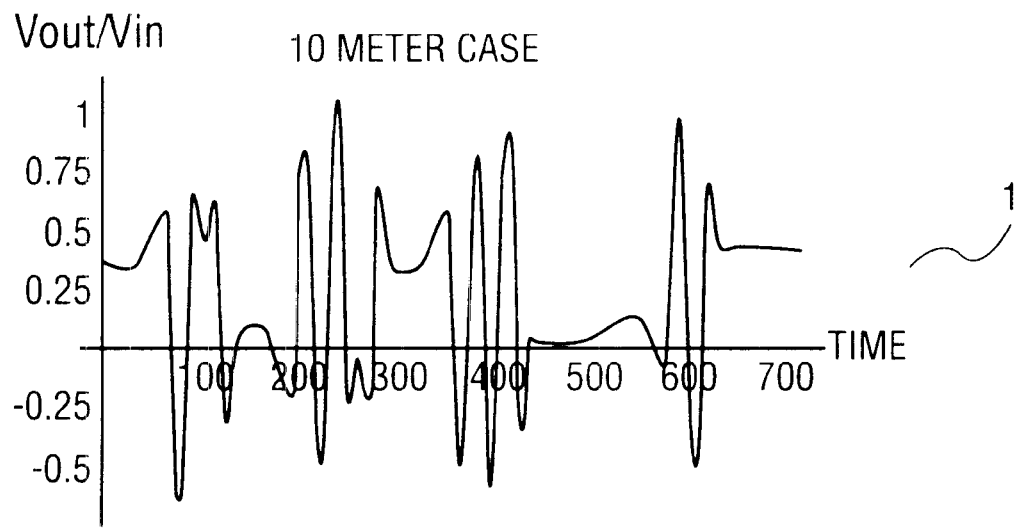
FIG. 3 shows an exemplary digital signal produced by a transmitter device.
Figure 3:
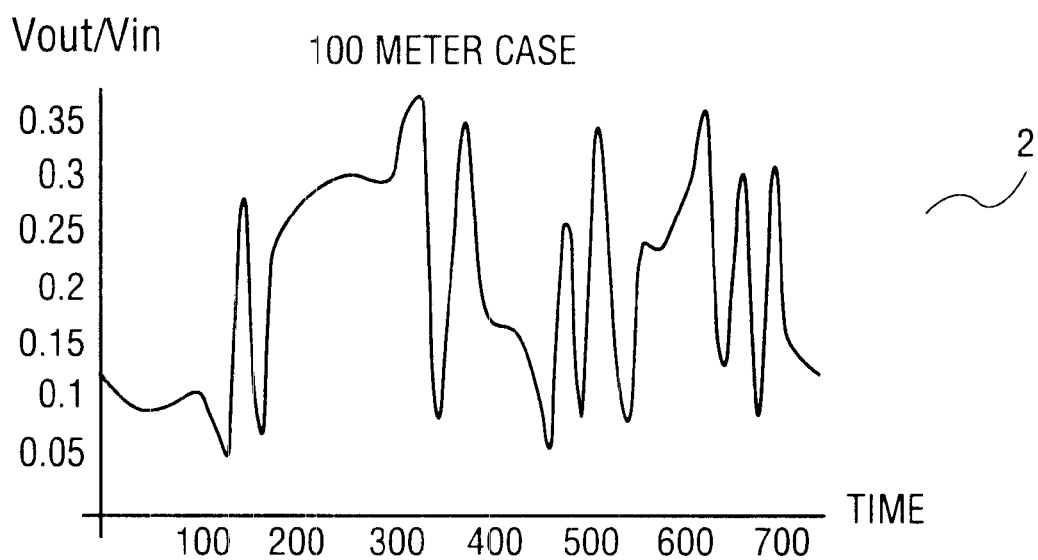

FIG. 3 shows an exemplary digital signal produced by an embodiment of a transmitter device in accordance with the present invention. The wave form at the top of FIG. 3 (waveform 1) exemplifies, at a 10 meter cable length, the ratio of input to output voltage of a digital signal after filtering is applied at the transmitter. The bottom waveform (waveform 2) exemplifies the ration of input to output voltage of the digital signal after transmission over a cable length of 100 meters. Of course, this is only one of numerous possible embodiments of signals which may be produced by the transmitter meant to exemplify signal characteristics introduced by filtering and transmission.

The waveforms depict characteristics of a filtered digital signal which, prior to filtering, comprised approximately rectangular shaped transitions in voltage (or possibly current) representing binary signals i.e. bits. Those schooled in the art of digital design will appreciate that binary signals may be interpreted at two distinct levels: a "high" and "low" signal level. The original pre-filtered signal which forms the basis of waveforms 1 and 2 may be a well formed binary signal which transitions from low to high with little or no overshoot or ringing. Transitions from high to low in the original signal may comprise similarly low overshoot and ring effects.

The top waveform demonstrates the digital signal after application of the filter described in FIG. 2 and transmission over 10 meters of cable. The bottom waveform demonstrates the filtered signal after transmission over 100 meters on a CAT-5 cable implementing EEEE P1394b signaling. As a result of the filtering applied at the transmitter, the signal may have a sufficiently distinct shape at 100 meters that a transmitter located at such length may recognize the original signal bits, despite the fact that the signal may have attenuated as a result of the cable's non-uniform frequency response. However, the filter has been adapted to cause overshoot of a predetermined signal level (for example, the level comprising a binary "one") by the signals at lengths along the cable substantially shorter than the maximum cable length (for example, 10 meters).

Figure 4:
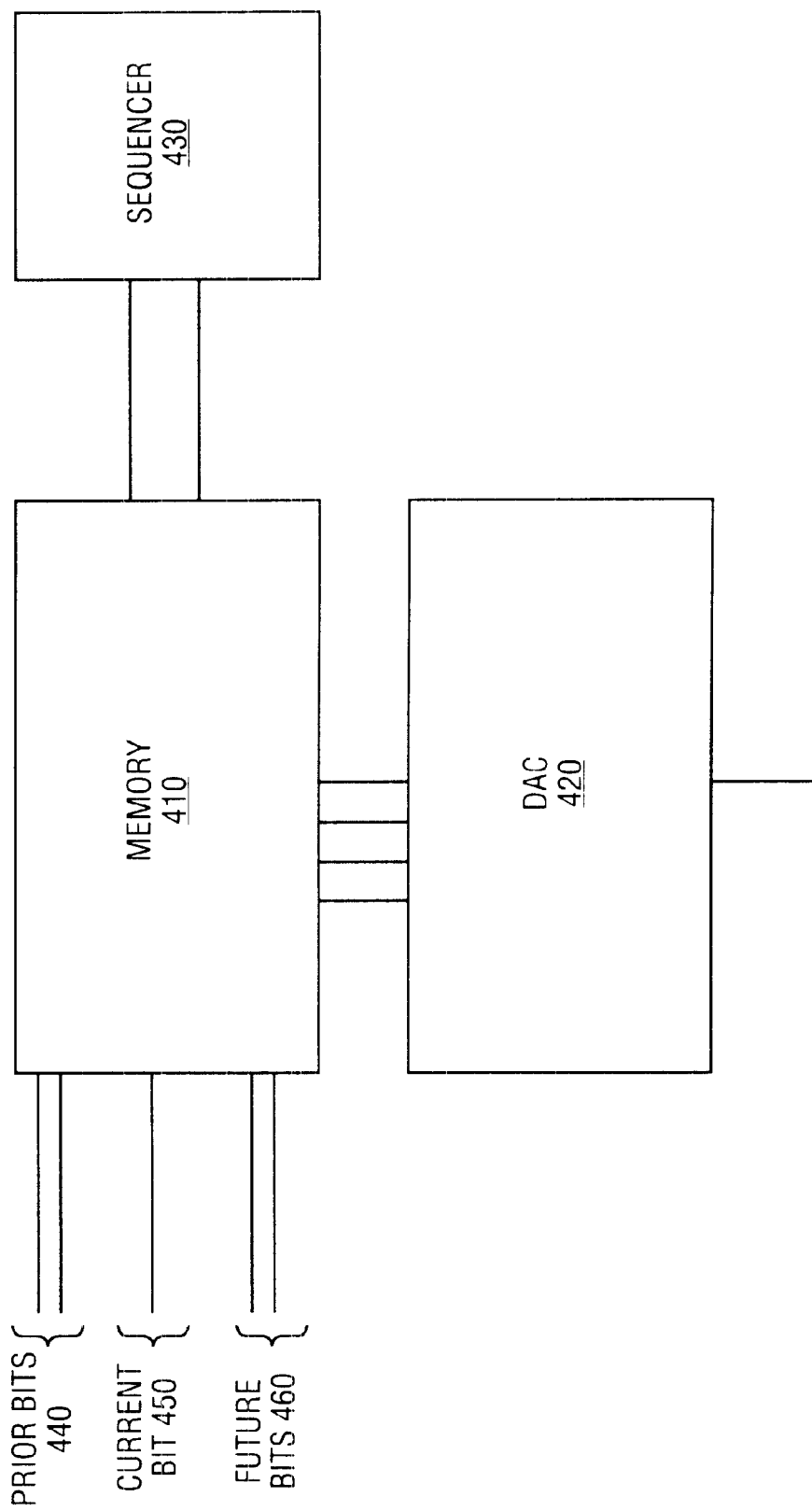
FIG. 4 shows an embodiment and a filter implemented using digital circuitry.

The filter may be implemented using analog components (discrete resistors and capacitors, for example). However, it may be desirable to implement the filter using digital circuitry to reduce the cost and manufacturing complexity which may be associated with the use of discrete analog components. FIG. 4 shows an embodiment 400 of a filter implemented using digital circuitry. The filter comprises a digital-to-analog converter (DAC) 420 coupled to the output of a memory 410. Memory 410 serves as a repository of predetermined signal levels for the DAC 420. Any of various memory technologies may be employed, including but not limited to Random Access Memory and Read-Only Memory. The output of memory 410 represents a signal level for the DAC 420 to output at a given moment in time. For example, for a 3 bit DAC with a one volt scale the memory location may comprise the following values:

| Memory Value | DAC Output Level |
|---|---|
| 000 | 0 V |
| 001 | .125 V |
| 010 | .25 V |
| 011 | .375 V |
| 100 | .5 V |
| 101 | .625 V |
| 110 | .75 V |
| 111 | 1 V |

One purpose of embodiment 400 is to simulate the characteristics of an analog filter, such as the filter described in FIG. 2, on a sequence of digital bits produced by a transmitting device. It may be desirable to provide signal "context" to the filter embodiment 400 so that the signal output at a given moment in time is a function of not only the current bit being produced by the transmitter, but also previous bits and bits to be output in the near future. In other words, to produce a more accurate simulation of a filter characteristic, it may be desirable to consider a "window" of bits when determining the current output of the DAC 420.

Thus, the memory location selected for output to the DAC 420 may determined by memory address inputs comprising prior bit inputs 440, current bit input 450 and future bit inputs 460. In one embodiment, two prior bit inputs, a single current bit input and two future bit inputs for a total of five address signal inputs are used, however, any number of address signals may be employed to the memory 410.

To simulate the action of an analog filter on a sequence of bits, the memory 410 may store values representing the filter output that would be generated by an analog filter for a "window" of bits at a moment in time. These values may be stored at locations in memory 410 identified by an address formed by combining prior bit inputs 440, current bit input 450 and future bit inputs 460. In this manner, the shape of the transmitted digital signal may be defined such that it approximates the shape which the digital signal may comprise when passed through an analog filter.

For more precise shape control, a sequencer 430 comprising additional address bits may be coupled to the memory. In one embodiment, sequencer 430 comprises a roll-over counter with 2 bits of output to provide four times the address resolution of embodiments employing no sequencer. The additional resolution provided by sequencer 430 may provide for the shaping of the transmitted signal within a single bit interval, by enabling memory 410 to store additional signal levels for inter-bit points-in time.

In one embodiment, output of memory 410 to DAC 420 comprises 3 or 4 bits, providing for a DAC output precision of 8 or 16 signal levels. Commercial 125 Mbaud, 3 and 4 bit DACs may be available at prices which are competitive relative to the costs of implementing the filter using discrete analog components.

To set the contents of the memory 410 comprising the desired signal levels for different digital sequences, the output signal of an analog filter may be simulated through all possible bit sequences of length N, where N is the "window" of the digital signal sequence to base the output upon. A memory 410 comprising $2^N$ addresses may be employed to store signal levels for all possible sequences of N bits. In the embodiment 400 depicted in FIG. 4, the window may comprise two prior bits 440 (bits already transmitted), a current bit to transmit 450, and two bits 460 to be transmitted in the future. The desired output signal level for each possible bit sequence may then be stored in locations of the memory 410 corresponding to address locations identified by the bit sequences themselves.

In summary, in one embodiment equalization may be employed at the transmitter device such that devices receiving signals from the transmitter device on the cable need not employ adaptive equalization but may instead employ simple clipping of the transmitted digital signal. The transmitter may apply a filter to the digital signal before transmission, the filter designed such that the digital signal will appear equalized to a receiving device at a maximum cable length. For receiving devices located at less than the maximum cable length, the digital signal may overshoot a digital signal level and the receiving device may employ clipping of the digital signal to adjust for the overshoot.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method of transmitting signals on a cable, the method comprising:

filtering the signals at a transmitter to equalize for non-uniform frequency response of the cable at a maximum cable length; and clipping the signals at a receiver when the filtering results in overshoot of a predetermined level by the signals.

2. The method of claim 1 in which filtering the signals further comprises:

applying a Butterworth filter comprising a transfer function of $C+s^2/(s^2+\sqrt{2}s+1)$ where C is approximately 0.4.

3. The method of claim 1 in which the signals are binary and transmitted on an NRZ CAT-5 cable.

4. The method of claim 1 in which filtering further comprises:

applying digital-to-analog converter with an output level determined by the contents of a memory location.

5. The method of claim 4 in which an address of the memory location comprises the signals.

6. The method of claim 5 in which the address comprises a current signal to transmit, at least one signal to transmit prior to the current signal, and at least one signal to transmit after the current signal.

7. An apparatus to transmit signals over a cable, the apparatus comprising:

a first filter unit to adjust the frequency components of the signals such that the frequency response of the cable to the signal is equalized at a maximum cable length; and a second filter unit to cause overshoot of a predetermined signal level by the signals at lengths along the cable substantially shorter than the maximum cable length.

8. The apparatus of claim 7, further comprising: a Butterworth filter comprising a transfer function of $C+s^2/(s^2+2s+1)$ where C is approximately 0.4.

9. The apparatus of claim 7, further comprising: an analog, filter comprising passive components.

10. The apparatus of claim 7 in which the signals are binary and transmitted on an NRZ CAT-5 cable.

11. The apparatus of claim 7 further comprising: a digital-to-analog converter with an output level determined by the contents of a memory location.

12. The apparatus of claim 11 in which the memory location comprises an address comprising the signals.

13. The apparatus of claim 12 in which the address comprises a current signal to transmit, at least one signal to transmit prior to the current signal, and at least one signal to transmit after the current signal.

14. The apparatus of claim 13 further comprising:

a sequencer to update the address at least once between the current signal to transmit and the at least one signal to transmit after the current signal.

15. An apparatus to transmit signals over a cable, the apparatus comprising:

a means for filtering the frequency components of the signals such that the frequency response of the cable to the signals is equalized at a maximum cable length;

a means for causing overshoot of a predetermined signal level by the signals at lengths along the cable substantially shorter than the maximum cable length.

* * * * *